(12) United States Patent  (10) Patent No.: US 8,453,167 B2
Liu et al.  (45) Date of Patent: May 28, 2013

(54) LOCKING MECHANISM AND AN OPTICAL DISK DRIVE HAVING THE SAME

(75) Inventors: Kuo-Chuan Liu, New Taipei (TW); Che-Sheng Yang, New Taipei (TW)

(73) Assignee: Wistron Corporation, New Taipei (TW)

( * ) Notice: Subject to any disclaimer, the term of this patent is extended or adjusted under 35 U.S.C. 154(b) by 1 day.

(21) Appl. No.: 13/154,155

(22) Filed: Jun. 6, 2011

(65) Prior Publication Data

US 2012/0110604 A1  May 3, 2012

(30) Foreign Application Priority Data

Nov. 3, 2010  (TW) ................................ 99137768 A

(51) Int. Cl.
  *G11B 17/03*  (2006.01)
(52) U.S. Cl.
  USPC ........................................................ 720/601
(58) Field of Classification Search
  USPC .......... 720/600, 601, 609, 610, 652; 312/215, 312/218, 9.11, 9.14, 9.16, 9.19, 9.28, 222
  See application file for complete search history.

(56) References Cited

U.S. PATENT DOCUMENTS

| 6,266,312 B1 * | 7/2001 | Akiba ........................... 720/610 |
| 7,363,634 B2 * | 4/2008 | Lin ................................. 720/610 |
| 2009/0199221 A1 * | 8/2009 | Wang et al. ................... 720/601 |

FOREIGN PATENT DOCUMENTS

TW  200935407  8/2009

* cited by examiner

*Primary Examiner* — Joseph Haley
*Assistant Examiner* — Gustavo Polo
(74) *Attorney, Agent, or Firm* — Ladas & Parry, LLP

(57) ABSTRACT

A locking mechanism for installation on a device body, which includes an actuating element, includes a bezel having a through hole and a first positioning portion spaced apart from the through hole, and a locking element including a front operating portion extending through and movable along the through hole in a left-right direction, at least one guide pin extending in a front-rear direction, and an engaging portion. A press button is mounted slidably on the guide pin, and includes a contact portion adapted to be spaced apart from the actuating element in the left-right direction. The front operating portion is operable to move the press button between non-operative and operative positions, where the contact portion is adapted to be placed out of and in alignment with the actuating element, respectively. The engaging portion engages the first positioning portion when the press button is in the non-operative position.

16 Claims, 9 Drawing Sheets

LOCKING MECHANISM AND AN OPTICAL DISK DRIVE HAVING THE SAME

CROSS-REFERENCE TO RELATED APPLICATIONS

This application claims priority of Taiwanese Patent Application No. 099137768 filed on Nov. 3, 2010, the disclosures of which is incorporated herein by reference.

BACKGROUND OF THE INVENTION

1. Field of the Invention

This invention relates to a locking mechanism, and more particularly to a locking mechanism having a safety lock function and an optical disk drive having the same.

2. Description of the Related Art

An optical disk drive for a computer is usually operated by pressing a button to activate an ejection mechanism for ejecting out a tray. However, this kind of structure easily results in ejection of the tray due to accidental touching of the button by a user or through the presence of an external force, so that, during reading of optical disk data by the optical disk drive, the optical disk drive suddenly stops reading or become damaged when the tray is bumped.

To overcome the aforesaid drawback, Taiwanese Patent Publication No. 200935407 discloses an ejection mechanism that prevents an accidental press and a disc driver using the same. Because a slide key structure is biased by a first biasing element, a trigger body of the slide key structure cannot be aligned with a tray-ejecting button, thereby placing the ejection mechanism in a lock position. Even if the user accidentally touches the slide key structure, the tray will not pop out. To unlock the ejection mechanism, the trigger body of the slide key structure is moved to align with the tray-ejecting button, after which the trigger body is pressed to contact the tray-ejecting button for ejecting the tray out of a housing.

However, the ejection mechanism of the aforesaid patent has numerous components, and the structure thereof is complicated. Hence, it consumes more assembly time, and has high production costs. Therefore, the area of improvement that the present invention focuses on is that related to realizing a simple structure for a locking mechanism.

SUMMARY OF THE INVENTION

A main object of the present invention is to provide a locking mechanism having a safety lock function to prevent accidental operation thereof and that has a simple structure which can minimize assembly time and production costs.

Another object of the present invention is to provide an optical disk drive having a locking mechanism. The locking mechanism having a safety lock function to prevent accidental operation thereof and that has a simple structure which can minimize assembly time and production costs.

The purpose of the present invention and the solution to the conventional technical problems are achieved through employment of the below technical means. According to one aspect of disclosure of the present invention, a locking mechanism for installation on a device body, which includes an actuating element for ejecting out a tray, comprises a bezel, a locking element, and a press button. The bezel is formed with a through hole, and includes a first positioning portion spaced apart from the through hole. The locking element is provided movably on the bezel, and includes a front operating portion extending through the through hole and movable along the through hole in a left-right direction, at least one guide pin extending in a front-rear direction, and an engaging portion to engage releasably the first positioning portion. The press button extends into the through hole, and is mounted slidably on the guide pin. The press button is adapted to be disposed in front of the actuating element, and includes a contact portion adapted to be spaced apart from the actuating element in a left-right direction. The contact portion is adapted to be alignable with the actuating element to contact and press the actuating element for ejecting the tray. The front operating portion is operable to move the press button between non-operative and operative positions. In the non-operative position, the contact portion is adapted to be placed out of alignment with the actuating element. In the operative position, the contact portion is adapted to be placed in alignment with the actuating element. The engaging portion engages the first positioning portion when the press button is in the non-operative position.

According to another aspect of this invention, an optical disk drive comprises a device body and a locking mechanism. The device body includes an outer casing, a tray disposed in the outer casing, and an actuating element for ejecting the tray out of the outer casing. The locking mechanism includes a bezel, a locking element, and a press button. The bezel is provided on a front side of the device body, and includes a through hole, and a first positioning portion spaced apart from the through hole. The locking element is provided movably on the bezel, and includes a front operating portion extending frontward through the through hole and movable along the through hole in a left-right direction, at least one guide pin extending in a front-rear direction, and an engaging portion to engage releasably the first positioning portion. The press button extends into the through hole, and is mounted slidably on the guide pin. The press button is disposed in front of the actuating element, and includes a contact portion spaced apart from the actuating element in a left-right direction. The contact portion is alignable with the actuating element to contact and press the actuating element for ejecting the tray. The front operating portion is operable to move the press button between non-operative and operative positions. In the non-operative position, the contact portion is placed out of alignment with the actuating element. In the operative position, the contact portion is placed in alignment with the actuating element. The engaging portion engages the first positioning portion when the press button is in the non-operative position.

Through the aforesaid technical means, the advantages and effectiveness of the optical disk drive having the locking mechanism according to the present invention reside in the fact that through the configuration of the locking element of the locking mechanism which is movable between a non-operative position and an operative position, a safety lock function is provided. Further, since the locking mechanism has few components and a simple structure, the assembly time and the production costs thereof can be effectively minimized.

BRIEF DESCRIPTION OF THE DRAWINGS

Other features and advantages of the present invention will become apparent in the following detailed description of the embodiment of the invention, with reference to the accompanying drawings, in which.

DETAILED DESCRIPTION OF THE PREFERRED EMBODIMENT

Figure 1:
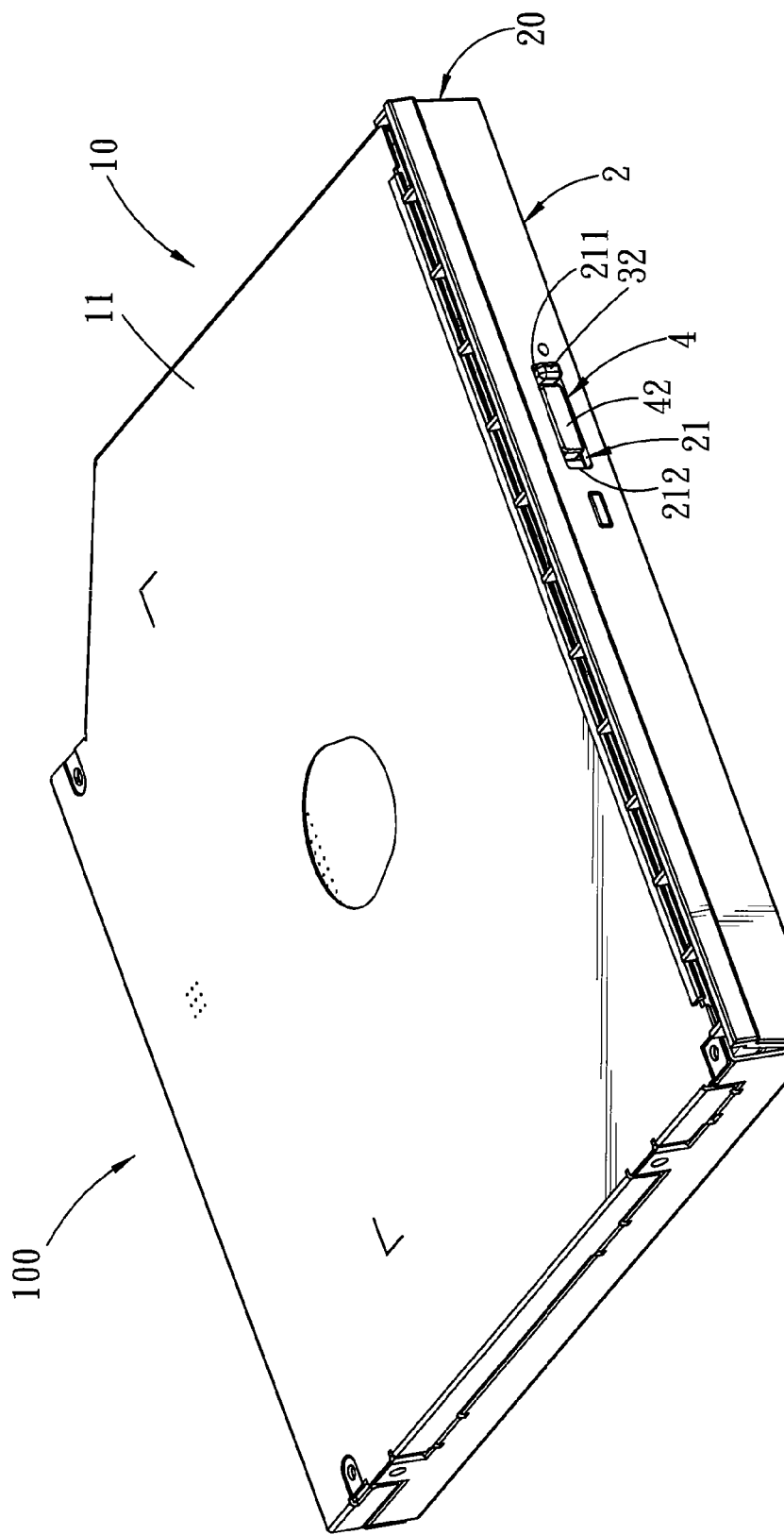
FIG. 1 is a perspective view of an optical disk drive having a locking mechanism according to the embodiment of the present invention.
Figure 2:
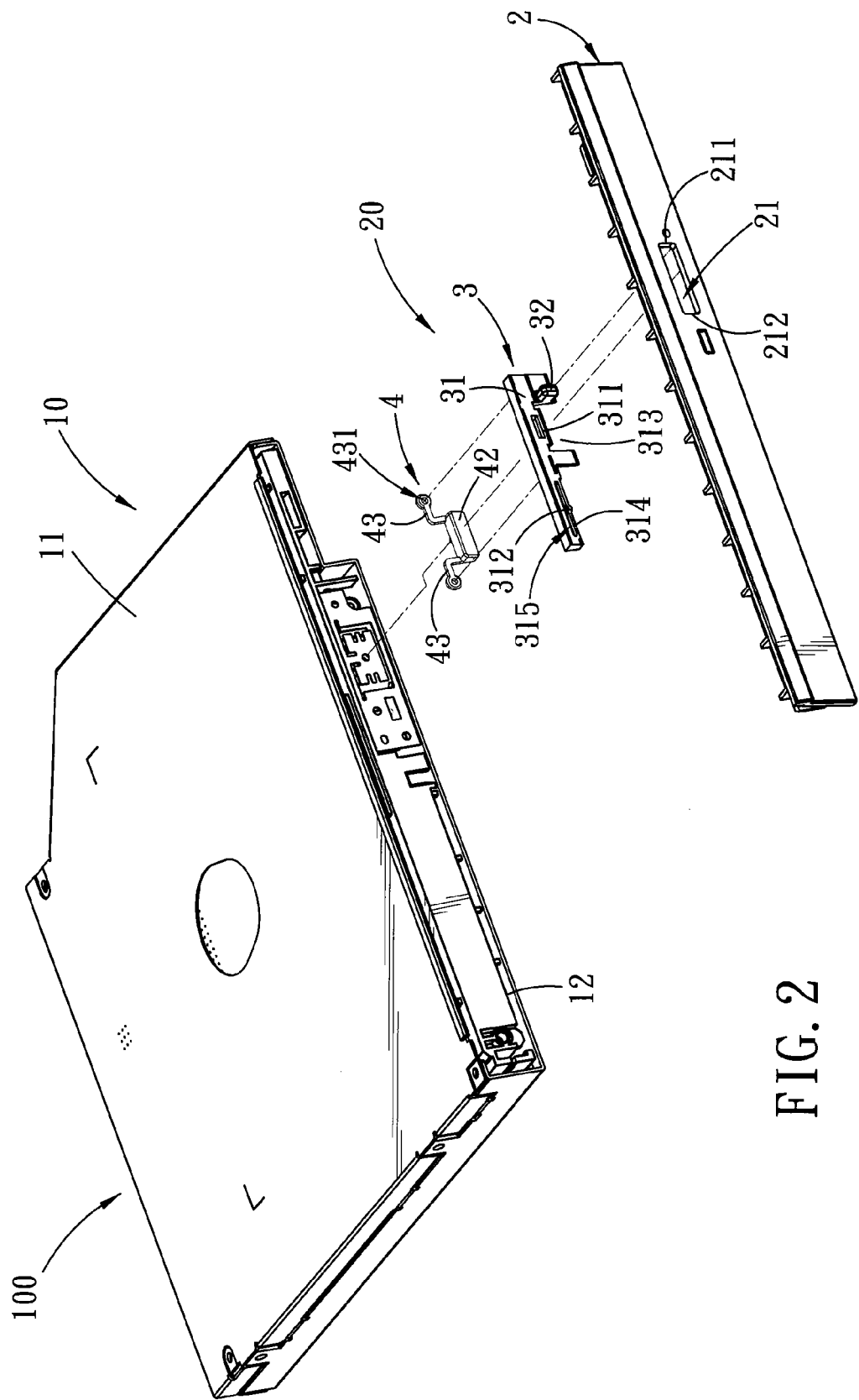
FIG. 2 is an exploded perspective view of the embodiment.

The above-mentioned and other technical contents, features, and effects of this invention will be clearly presented from the following detailed description of the embodiment in coordination with the reference drawings. Through description of the concrete implementation method, the technical means employed and the effectiveness to achieve the predetermined purposes of the present invention will be thoroughly and concretely understood. However, the enclosed drawings are used for reference and description only, and are not used for limiting the present invention.

Referring to FIGS. 1 to 10, an optical disk drive 100 according to the embodiment of the present invention is adapted to be applied to a notebook computer or a desktop computer, and is shown to comprise a device body 10 and a locking mechanism 20.

The device body 10 includes an outer casing 11, and a tray 12 disposed in the outer casing 11 and adapted to hold an optical disk (not shown). An actuating element 13 (see FIG. 5) is provided inside the outer casing 11, and is adapted to connect with and actuate an ejection mechanism (not shown). The ejection mechanism, in turn, can eject the tray 12 out of the outer casing 11.

The locking mechanism 20 includes a bezel 2, a locking element 3, and a press button 4. The bezel 2 is disposed on the front side of the device body 10, and may be fixed to a front end of the tray 12 using a screw-fastening method or a snap-fastening method. The bezel 2 includes an elongated through hole 21 extending in a left-right direction, and a slide groove 22 (see FIGS. 4 and 5) provided on an inner side of the bezel 2 and communicating spatially with the through hole 21. The locking element 3 includes a plate body 31 disposed within and slidable along the slide groove 22 relative to the bezel 2, and a front operating portion 32 projecting from a front end of the plate body 31 and extending frontward through the through hole 21. The front operating portion 32 is movable along the through hole 21 in the left-right direction. Through this configuration, a user can operate the front operating portion 32 to slide the locking element 3 relative to the bezel 2. Preferably, in order to stably position the locking element 3 on the slide groove 22, the bezel 2 further includes a hook 23, and the plate body 31 is formed with an elongated slide hole 311 extending in the left-right direction. The hook 23 engages slidably the slide hole 311. As such, the locking element 3 can slide stably along the slide groove 22, and will not be easily removed from the slide groove 22.

A groove wall 24 that defines the slide groove 22 of the bezel 2 is provided with a first positioning portion 241 spaced apart from the through hole 21. The plate body 31 of the locking element 3 is provided with an engaging portion 312 projecting therefrom to engage releasably the first positioning portion 241. Through this configuration, the locking element 3 can be disposed at a position shown in FIG. 4. The locking element 3 further includes a resilient split stripportion 314 extending in the left-right direction, and a split opening 315 in juxtaposition to the resilient split strip portion 314. The engaging portion 312 is formed on the resilient split strip portion 314.

The locking element 3 further includes two guide pins 33 extending from a rear end of the plate body 31 in a front-rear direction and spaced apart in the left-right direction. The press button 4 extends into the through hole 21, and is disposed in front of the actuating element 13. The press button 4 is mounted slidably on the guide pins 33, and includes a contact portion 41 (see FIG. 5) spaced apart from the actuating element 13 in the left-right direction, a press portion 42 disposed on a front end of the contact portion 41 and extending into the through hole 21 through a notch 313 in the plate body 31, and two inverted L-shaped connecting portions 43 connected respectively to left and right sides of the press portion 42 and respectively having passage holes 431 for extension of the guide pins 33 therethrough. Through this configuration, the press button 4 can move stably along the guide pins 33 and will not rock relative to the locking element 3. It should be noted that, in an alternative embodiment, only one guide pin 33 and one connecting portion 43 may be employed. The effect of moving the press button 4 along the guide pin 33 may be similarly achieved.

Figure 3:
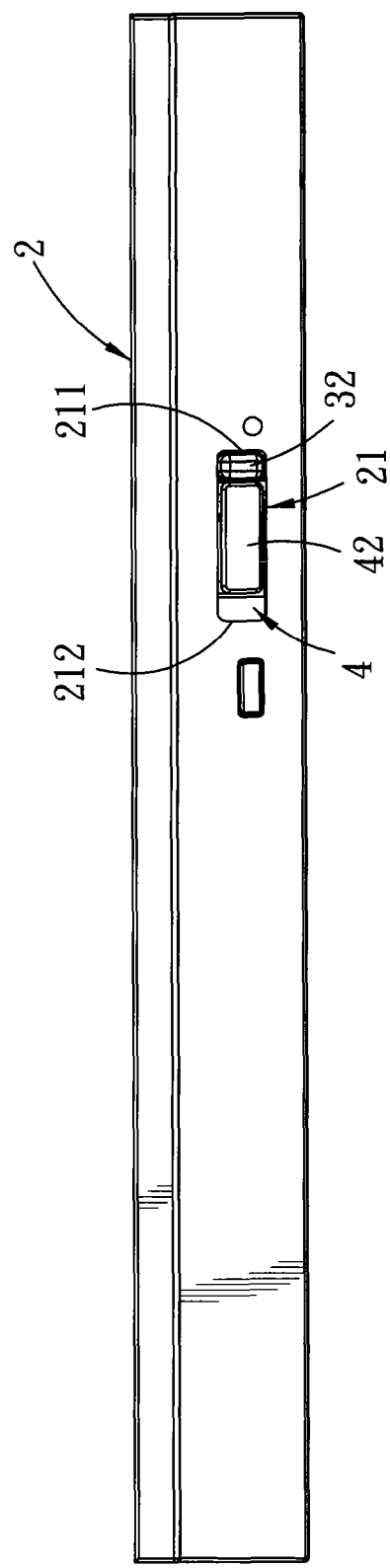
FIG. 3 is a schematic front view of a bezel of the embodiment, illustrating the locking mechanism in a non-operative position.
Figure 4:
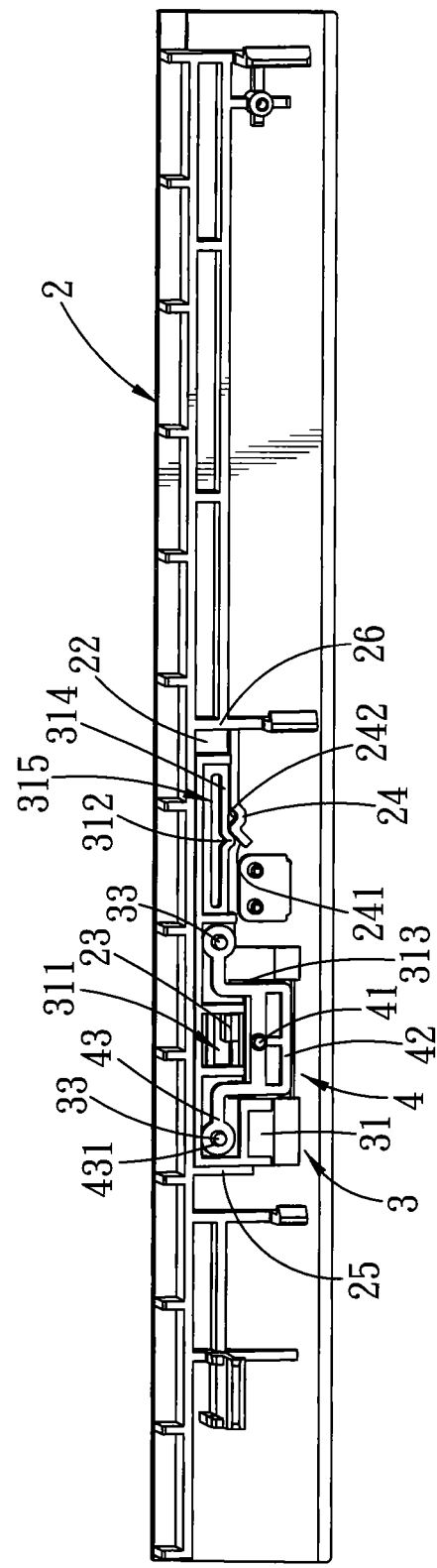
FIG. 4 is a schematic rear view of the bezel of the embodiment, illustrating the locking mechanism in the non-operative position.
Figure 5:
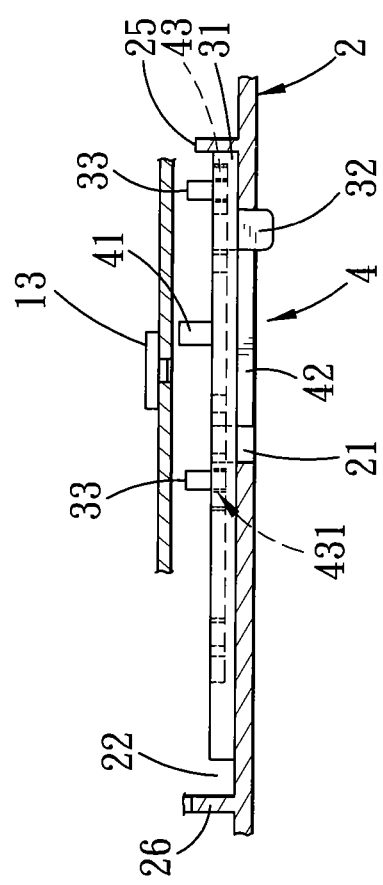
FIG. 5 is a fragmentary sectional view of the embodiment, illustrating the locking mechanism in the non-operative position.

With reference to FIGS. 3 to 5, when the locking element 3 is in a first engaging position, where the engaging portion 312 is engaged to the first positioning portion 241, as shown in FIG. 4, the contact portion 41 of the press button 4 is spaced apart from the actuating element 13 in the left-right direction. The press button 4 is placed in a non-operative position at this time, so that even if the press portion 42 of the press button 4 is accidentally pressed or is bumped by an external force, the tray 12 can be maintained within the outer casing 11 and cannot be easily ejected out of the outer casing 11. Preferably, in order to stably position the locking element 3 in the first engaging position, one of below two methods may be employed. First, the bezel 2 may further include a first stop portion 25 projecting from an inner side thereof and spaced apart from the first positioning portion 241 in the left-right direction. By abutting a right end face of the plate body 31 of the locking element 3 against the first stop portion 25, the locking element 3 can be stably disposed in the first engaging position and cannot rock relative to the bezel 2. Second, the through hole 21 may include a first right end 211, and by abutting the front operating portion 32 against the first right end 211, the effect of stably disposing the locking element 3 in the first engaging position can be similarly achieved. Further, by abutting the front operating portion 32 against the first right end 211, the user can clearly and conveniently perceive the current position of the locking element 3 which is at the first engaging position.

Figure 6:
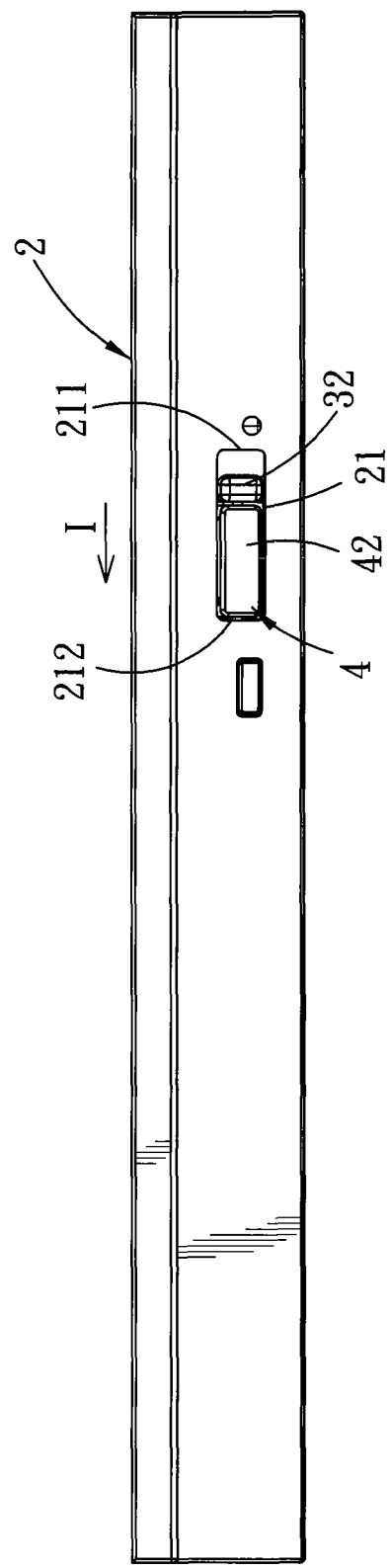
FIG. 6 is a view similar to FIG. 3, but illustrating the locking mechanism in an operative position.
Figure 7:
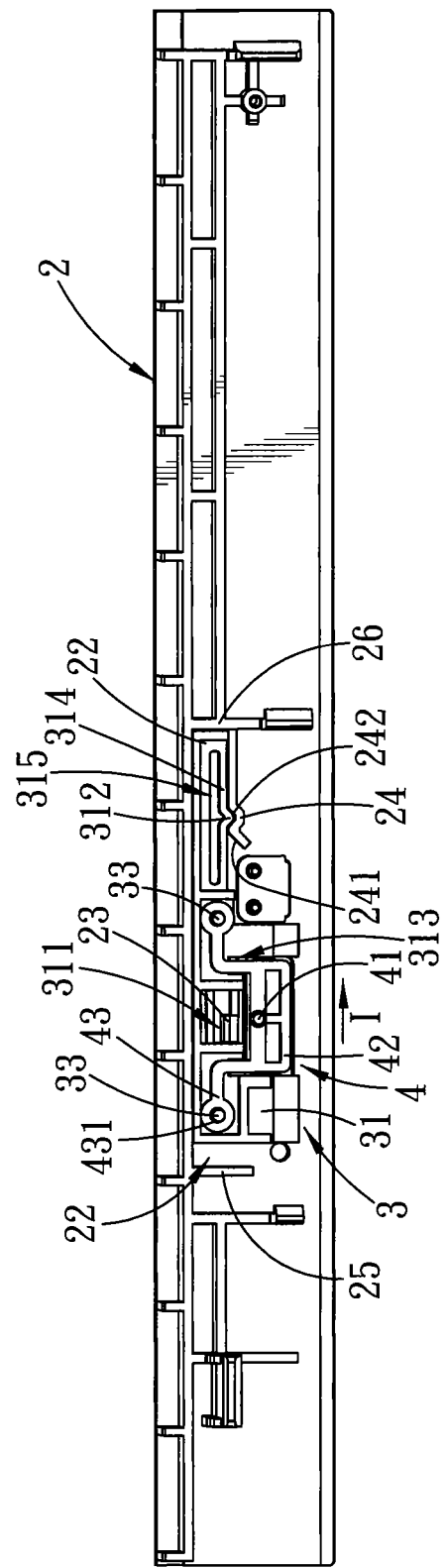
FIG. 7 is a view similar to FIG. 4, but illustrating the locking mechanism in the operative position.
Figure 8:
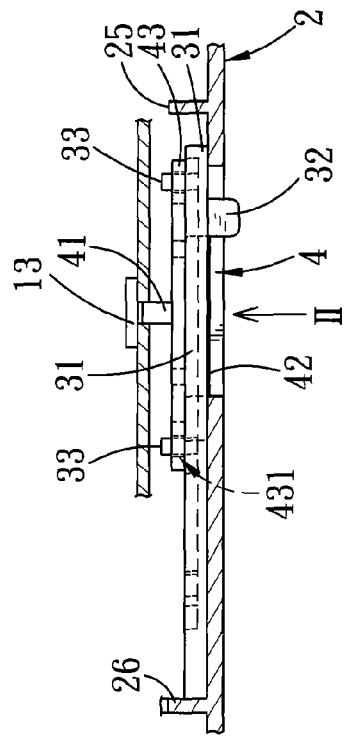
FIG. 8 is a view similar to FIG. 5, but illustrating the locking mechanism in the operative position.

With reference to FIGS. 6 to 8, to eject the tray 12 out of the outer casing 11 (see FIG. 10), the locking element 3 is moved from the first engaging position shown in FIG. 4 to a second engaging position shown in FIG. 7 so as to move the press button 4 from the non-operative position shown in FIG. 5 to an operative position shown in FIG. 8. When the user moves the front operating portion 32 leftward in the direction of an arrow (I) shown in FIG. 6, the engaging portion 312 is pressed against the first positioning portion 241 until the resilient split strip portion 314 is deformed and the engaging portion 312 retracts into the split opening 315 to disengage from the first positioning portion 241.

The front operating portion 32 of the locking element 3 is moved continuously to dispose the press button 4 in the operative position shown in FIG. 8. At this stage, the contact portion 41 of the press button will align with the actuating element 13. Because the groove wall 24 of the bezel 2 is further formed with a second positioning portion 242 that is spaced apart from the first positioning portion 241 in the left-right direction, when the engaging portion 312 of the locking element 3 moves from the first positioning portion 241 to the second positioning portion 242, through a restoring force of the resilient split strip portion 314, the engaging portion 312 can engage the second positioning portion 242, thereby disposing the press button 4 in the operative position.

Preferably, to stably dispose the locking element 3 in the second engaging position, the bezel 2 further includes a second stop portion 26 projecting from the inner side thereof and spaced apart from the first stop portion 25 in the left-right direction. By abutting the second stop portion 26 against a left end face of the plate body 31 of the locking element 3, the locking element 3 can be stably disposed in the second engaging position and will not rock relative to the bezel 2. Another alternative for stably disposing the locking element 3 in the second engaging position is to abut the press portion 42 of the press button 4 against a second end 212 of the through hole 21 which is spaced apart from the first end 211 in the left-right direction. Further, by abutting the press portion 42 against the second end 212, the user can clearly and conveniently perceive the current position of the locking element 3 which is at the second engaging position.

Figure 9:
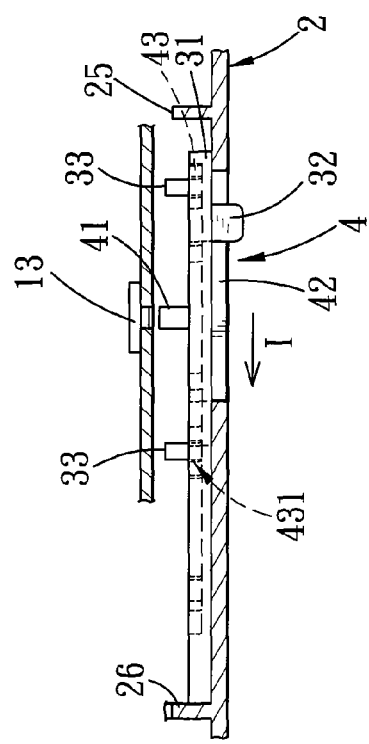
FIG. 9 is a view similar to FIG. 8, but illustrating a press portion of a press button pushing against an actuating element.
Figure 10:
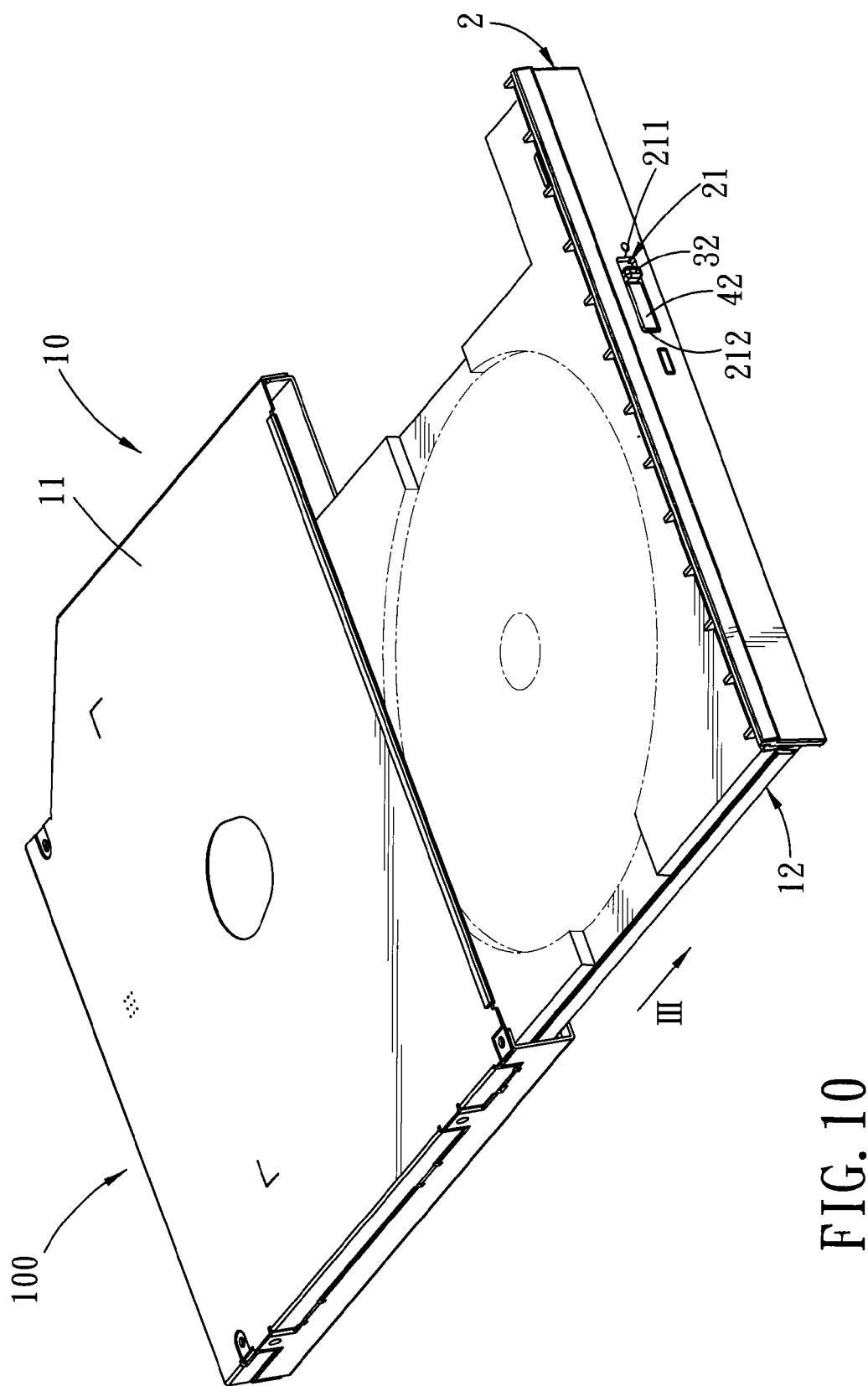
FIG. 10 is a perspective view of the embodiment, illustrating a tray being ejected out of an outer casing.

With reference to FIGS. 9 and 10, when the locking element 3 is in the second engaging position, the user can press the press portion 42 in the direction of an arrow (II) so as to move the contact portion 41 to contact and press the actuating element 13. When the contact portion 41 presses the actuating element 13, the actuating element 13, in turn, will actuate the ejection mechanism for ejecting the tray 12 out of the outer casing 11 in the direction of an arrow (III). At this time, the user can place or remove an optical disk onto or from the tray 12. To shift the locking element 3 back to the first engaging position, the front operating portion 32 of the locking element 3 is moved rightward in reverse to the direction of the arrow (I) so as to move the engaging portion 312 away from the second positioning portion 242 and disengage from the same. When the engaging portion 312 engages the first positioning portion 241 and the plate body 31 abuts against the first stop portion 25, the locking element 3 is restored and positioned in the first engaging position, and the press button 4 is disposed in the non-operative position.

From the aforesaid description, the optical disk drive 100 of the embodiment can provide a safety lock function through the locking element 3 of the locking mechanism 20 which is movable between the first and second engaging positions to dispose the press button 4 in the non-operative and operative positions, respectively. In the non-operative position, the tray 12 is maintained within the outer casing 11 even if the press portion 42 of the press button 4 is accidentally pressed or is bumped by an external force. In the operative position, the press portion 42 can be pressed to move the contact portion 41 to contact and press the actuating element 13 which, in turn, actuates the ejection mechanism to eject the tray 12 out of the outer casing 11. Moreover, since the locking mechanism 20 has less components and a simple structure, the assembly time and the manufacturing costs thereof can be effectively minimized. Hence, the objects of the present invention can be realized.

While the present invention has been described in connection with what is considered the most practical and embodiment, it is understood that this invention is not limited to the disclosed embodiment but is intended to cover various arrangements included within the spirit and scope of the broadest interpretations and equivalent arrangements.

We claim:

1. A locking mechanism for installation on a device body, the device body including an actuating element for ejecting out a tray, said locking mechanism comprising:
   a bezel formed with a through hole and including a first positioning portion spaced apart from said through hole;
   a locking element provided movably on said bezel and including a front operating portion extending through said through hole and movable along said through hole in a left-right direction, at least one guide pin extending in a front-rear direction, and an engaging portion configured to releasably engage said first positioning portion; and
   a press button extending into said through hole and mounted slidably on said guide pin, said press button being adapted to be disposed in front of the actuating element and including a contact portion adapted to be spaced apart from the actuating element in the left-right direction, said contact portion being adapted to be alignable with the actuating element to contact and press the actuating element for ejecting the tray;
   wherein said front operating portion being operable to move said press button between a non-operative position, where said contact portion is adapted to be placed out of alignment with the actuating element, and an operative position, where said contact portion is adapted to be placed in alignment with the actuating element, said engaging portion configured to engage and disengage said first positioning portion when said press button is in said non-operative and operative positions, respectively.

2. The locking mechanism of claim 1, wherein said bezel further includes a second positioning portion adjacent to said first positioning portion in the left-right direction, said engaging portion configured to releasably engage said second positioning portion when said press button is in said operative position.

3. The locking mechanism of claim 2, wherein said locking element further includes a resilient split strip portion extending in the left-right direction, and a split opening in juxtaposition to said resilient split strip portion, said engaging portion being formed on said resilient split strip portion.

4. The locking mechanism of claim 3, wherein said press button further includes a press portion disposed on a front end of said contact portion and extending into said through hole, and a connecting portion provided on said press portion and having a passage hole for extension of said guide pin therethrough.

5. The locking mechanism of claim 1, wherein said locking element includes two said guide pins, said press button including a press portion disposed on a front end of said contact portion and extending into said through hole, and two connecting portions provided respectively on left and right sides of said press portion and respectively having passage holes for extension of said guide pins therethrough.

6. The locking mechanism of claim 2, wherein said bezel further includes a hook, said locking element further including an elongated slide hole extending in the left-right direction, said hook engaging slidably said slide hole.

7. The locking mechanism of claim 2, wherein said bezel further includes first and second stop portions spaced apart in the left-right direction, wherein, when said engaging portion engages said first positioning portion, said locking element abuts against said first stop portion, and when said engaging portion engages said second positioning portion, said locking element abuts against said second stop portion.

8. The locking mechanism of claim 2, wherein said through hole is elongated, and has first and second ends spaced apart in the left-right direction, wherein, when said engaging portion engages said first positioning portion, said front operating portion abuts against said first end, and when said engaging portion engages said second positioning portion, said press portion abuts against said second end.

9. An optical disk drive comprising:
   a device body including an outer casing, a tray disposed in said outer casing, and an actuating element for ejecting said tray out of said outer casing; and
   a locking mechanism, said locking mechanism comprising:
   a bezel provided on a front side of said device body and including a through hole, and a first positioning portion spaced apart from said through hole;
   a locking element provided movably on said bezel and including a front operating portion extending through said through hole and movable along said through hole in a left-right direction, at least one guide pin extending in a front-rear direction, and an engaging portion configured to releasably engage said first positioning portion; and
   a press button extending into said through hole and mounted slidably on said guide pin, said press button being disposed in front of said actuating element and including a contact portion spaced apart from said actuating element in the left-right direction, said contact portion being alignable with said actuating element to contact and press said actuating element for ejecting the tray;
   wherein said front operating portion being operable to move said press button between a non-operative position to place said contact portion out of alignment with said actuating element, and an operative position to place said contact portion in alignment with said actuating element, said engaging portion configured to engage and disengage said first positioning portion when said press button is in said non-operative and operative positions, respectively.

10. The optical disk drive of claim 9, wherein said bezel further includes a second positioning portion adjacent to said first positioning portion in the left-right direction, said engaging portion configured to releasably engage said second positioning portion when said press button is in said operative position.

11. The optical disk drive of claim 10, wherein said locking element further includes a resilient split strip portion extending in the left-right direction, and a split opening in juxtaposition to said resilient split strip portion, said engaging portion being formed on said resilient split strip portion.

12. The optical disk drive of claim 11, wherein said press button further includes a press portion disposed on a front end of said contact portion and extending into said through hole, and a connecting portion provided on said press portion and having a passage hole for extension of said guide pin therethrough.

13. The optical disk drive of claim 9, wherein said locking element includes two said guide pins spaced apart in the left-right direction, said press button including a press portion disposed on a front end of said contact portion and extending into said through hole, and two connecting portions provided respectively on left and right sides of said press portion and respectively having passage holes for extension of said guide pins therethrough.

14. The optical disk drive of claim 10, wherein said bezel further includes a hook, said locking element further including an elongated slide hole extending in the left-right direction, said hook engaging slidably said slide hole.

15. The optical disk drive of claim 10, wherein said bezel further includes first and second stop portions spaced apart in the left-right direction, wherein, when said engaging portion engages said first positioning portion, said locking element abuts against said first stop portion, and when said engaging portion engages said second positioning portion, said locking element abuts against said second stop portion.

16. The optical disk drive of claim 10, wherein said through hole is elongated, and has first and second ends spaced apart in the left-right direction, wherein, when said engaging portion engages said first positioning portion, said front operating portion abuts against said first end, and when said engaging portion engages said second positioning portion, said press portion abuts against said second end.

* * * * *